Nov. 25, 1969  B. F. MULASKEY  3,480,531
HYDROGENATION OF HYDROCARBONS WITH MIXED TIN AND NICKEL CATALYST
Filed July 12, 1968
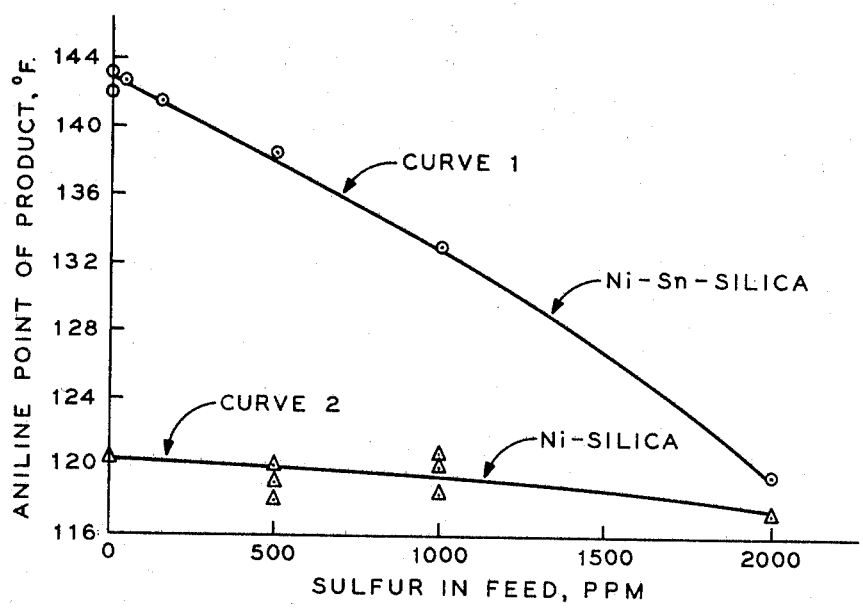
INVENTOR
BERNARD F. MULASKEY
BY
ATTORNEYS

United States Patent Office 3,480,531
Patented Nov. 25, 1969

3,480,531
HYDROGENATION OF HYDROCARBONS WITH MIXED TIN AND NICKEL CATALYST
Bernard F. Mulaskey, Pinole, Calif., assignor to Chevron Research Company, San Francisco, Calif., a corporation of Delaware
Continuation-in-part of application Ser. No. 645,855, June 8, 1967. This application July 12, 1968, Ser. No. 744,370
Int. Cl. C10g 23/02
U.S. Cl. 208—143      11 Claims

ABSTRACT OF THE DISCLOSURE

Unsaturated hydrocarbons, particularly aromatics, are converted to more saturated hydrocarbons, without substantial cracking, by contacting the hydrocarbons in the presence of hydrogen at hydrogenation conditions with a catalyst comprising nickel and tin, or their compounds, associated with a porous solid carrier.

Cross-reference

This application is a continuation-in-part of application Ser. No. 645,855, filed June 8, 1967, now patent No. 3,399,132, which is in turn a continuation-in-part of application Ser. No. 568,536, filed July 28, 1966, now abandoned.

BACKGROUND OF THE INVENTION

Field of the invention

The present invention relates to hydrogenation of unsaturated hydrocarbon fractions. More particularly, the present invention is concerned with hydrogenating a hydrocarbon jet fuel fraction to produce an improved jet fuel without substantial cracking by contacting said fraction at hydrogenation conditions in the presence of hydrogen with a catalyst comprising nickel and tin, or their compounds, associated with a porous nonacidic solid carrier.

Prior art

Catalytic hydrogenation processes are well known and comprise contacting a hydrocarbon oil with a hydrogenation catalyst in an excess of hydrogen in a reaction zone at hydrogenation conditions. The process is conveniently conducted by passing the mixture of oil and hydrogen through one or more fixed beds of catalyst particles contained in a reactor, separating reactor effluent into hydrogenated oil and hydrogen-rich gas, recycling the hydrogen-rich gas to a reactor with added makeup hydrogen, and recovering the hydrogenated oil. The process can be conducted in a slurry, in a fluidized bed reactor or in a fixed bed reactor. Multiple stages of one or more of the foregoing ways may also be used.

Hydrogenation processes are particularly important not only in converting unsaturated paraffins to saturated paraffins, for example, converting butenes to butanes, but also in converting aromatics, e.g., benzene, to cycloparaffins, e.g., cyclohexane. Also because of the great demand today for jet fuels, processes which can convert jet fuel cuts or fractions from hydrocracking or catalytic cracking zones to more saturated fractions, i.e., to better jet fuels having a higher smoke point, would represent a significant contribution to refiners. Generally, jet fuels boil within the range from 300 to 550° F. and are preferably highly paraffinic. The jet fuel fractions recovered or separated from hydrocracking or catalytic cracking effluents often are more aromatic than desired. Thus, the fractions are preferably hydrogenated to reduce the aromatic content and/or to convert unsaturated paraffins to more saturated paraffins.

Catalysts extensively used for hydrogenation of aromatics and other unsaturated hydrocarbons comprise platinum on alumina. Platinum, however, is very expensive and therefore requires a large outlay of capital for a catalyst charge. Accidental damage to the catalysts during processing can be extremely costly. Accordingly, there is a definite need for less expensive hydrogenation catalysts.

Nickel-containing catalysts have found some utility in hydrogenation processes. Nickel, of course, is significantly less expensive than platinum, and hence any use of nickel-containing catalysts results in a substantial savings in capital outlay compared to platinum catalysts. Generally, however, nickel catalysts are less active for hydrogenation reactions than noble metal catalysts, e.g., platinum. Furthermore, nickel catalysts are readily poisoned by the presence of sulfur. Hence, any means for increasing the hydrogenation activity of nickel-containing catalysts and for increasing the resistance to irreversible sulfur poisoning, e.g., by the addition of inexpensive promoters, would represent a significant contribution to the hydrogenation art.

SUMMARY OF THE INVENTION

In application Ser. No. 568,536, now abandoned, and application Ser. No. 645,855, a catalyst comprising nickel and tin, or their compounds, in certain concentration ranges associated with a porous acidic inorganic oxide carrier was disclosed and claimed for hydrocracking processes. Nickel and tin in association with a porous solid carrier, particularly a nonacidic porous solid carrier, are also useful in other reactions, for example, hydrogenation-type reactions, preferably hydrogenation of aromatics. Furthermore, the catalyst is not only valuable in aromatic hydrogenation but also in hydrogenating jet fuel fractions to produce improved jet fuels. In hydrogenation reactions, the catalyst comprising nickel and tin is not irreversibly poisoned by sulfur.

Thus, the process of the present invention comprises converting unsaturated hydrocarbons to more saturated hydrocarbons, without substantial cracking, by subjecting the unsaturated hydrocarbons to hydrogenation in the presence of hydrogen and a catalyst comprising nickel, or compounds of nickel, and tin, or compounds of tin, associated with a porous solid carrier, the nickel and tin combined weight percent being from 3 to 60 and the nickel to tin weight ratio being from 0.25 to 20. It is preferable to use nonacidic carriers. The unsaturated hydrocarbons are preferably aromatics.

Furthermore, the process of the present invention comprises converting a hydrocarbon jet fuel fraction boiling within the range from 300 to 550° F. and preferably containing less than about 4000 p.p.m. sulfur to feed, without substantial cracking, to an improved jet fuel which comprises contacting said fraction at hydrogenation conditions including a temperature from 300 to 750° F. and a pressure of 600 to 2000 p.s.i.g. in the presence of hydrogen with a catalyst comprising nickel and tin, or their compounds, associated with a porous nonacidic carrier, the nickel to tin combined weight percent being from 3 to 60 and preferably from 3 to 50, and the nickel to tin weight ratio being from 0.25 to 20 and preferably from 0.25 to 10.

BRIEF DESCRIPTION OF THE DRAWING

The present invention will be more clearly defined by reference to the figure which shows for comparison purposes the product aniline point versus the sulfur level in the feed for a jet fuel hydrogenation process using a catalyst comprising nickel and tin associated with silica (curve 1) and a catalyst comprising nickel associated with silica, no tin being present (curve 2). The jet fuel fraction boiling from 308 to 526° F. was hydrogenated at hydrogenation conditions including a temperature of about 665° F., a pressure of 1300 p.s.i.g., and a hydrogen flow rate of 1500 s.c.f./bbl. The aniline point is a measure of the aromaticity of the product, that is, as the aniline point increases the aromatic content in the product decreases; hence, a product having a high aniline point is considered to be low in aromatics. It is observed that the aniline point of the product from the process using the nickel-tin catalyst was significantly higher than that of the aniline point of the product from the process using the nickel catalyst without tin. Furthermore, as the sulfur level in the feed was decreased, the aniline point of the product increased significantly for the process using the nickel-tin catalyst, i.e., as the sulfur content of the feed decreased, the hydrogenation activity of the nickel-tin catalyst significantly increased.

DESCRIPTION OF THE INVENTION

The nickel-tin containing catalyst is valuable for converting unsaturated hydrocarbons to more saturated hydrocarbons in the presence of hydrogen and at hydrogenating conditions without substantial cracking of the feed. Thus, the process is particularly valuable in those circumstances where, as distinguished from hydrocracking, only changes in the saturation of the product from the feed is desired and no change is desired in the carbon content of the hydrocarbon molecules. Thus, in converting butenes to butanes by hydrogenation, it is desired to obtain high conversion without obtaining light products boiling below the $C_4$ range; that is, no cracking should occur.

The nickel-tin catalyst, as a preferred embodiment, is useful in converting aromatics to more saturated hydrocarbons, without converting the aromatics to lower boiling products. Thus, the process finds use in the production of specific chemicals, for example, cyclohexane, from benzene. A high conversion of the feed to the desired saturated product is possible without the production of substantial amounts of light gases or products boiling below the desired product boiling point.

Still further, the nickel-tin catalyst is especially valuable in converting jet fuel boiling range fractions to more saturated fractions at hydrogenation conditions in the presence of hydrogen. Jet fuel fractions generally boil within the range from 300 to 550° F. and preferably from 320 to 500° F. The feeds are generally highly paraffinic or naphthenic, i.e., should preferably contain at least 80 volume percent paraffins and naphthenes, and should be low in aromatic content, i.e., should contain less than 20 volume percent aromatics and preferably less than 10 volume percent aromatics. The present process results in substantial hydrogenation of the unsaturated hydrocarbons, particularly the aromatics in the jet fuel fractions, to produce an improved jet fuel product. Substantially no cracking occurs during the present process and thus less valuable light products are not produced. It is preferred that the sulfur level in the jet fuel fraction to be hydrogenated contain less than about 4000 p.p.m. sulfur and preferably less than about 2000 p.p.m. sulfur. The lower the sulfur concentration in the jet fuel fractions, the easier it is to hydrogenate the unsaturated hydrocarbons with the nickel-tin containing catalyst.

The conditions used for hydrogenating unsaturated hydrocarbons to more saturated hydrocarbons depend somewhat on the feed involved. Thus, when converting unsaturated paraffins to more saturated paraffins, the temperature is preferably in the range from 200 to 900° F., depending on the boiling point of the feed, the paraffin-olefin hydrogenation equilibrium, etc., and more preferably from 300 to 750° F The pressure will preferably be from atmospheric to 1500 p.s.i.g. When converting aromatics to more saturated products, the reaction temperature will preferably be from 300 to 800° F. and more preferably from 500 to 750° F. The pressure will be substantially that used when hydrogenating unsaturated paraffins. The space velocity (LHSV) and the hydrogen flow rate are correlated with the temperature and pressure to permit hydrogenation reactions to proceed, but to decrease or prevent cracking reactions. Thus, when operating at higher pressures, lower temperatures or higher space velocities can be used to decrease the possibility of cracking.

The process of the present invention finds its greatest utility in jet fuel hydrogenation. For a successful jet fuel hydrogenation process, the temperature is preferably held within the range from 350 to 750° F. and more preferably from 500 to 750° F. The pressure will be preferably from 600 to 2000 p.s.i.g. and more preferably from 600 to 1500 p.s.i.g. Sufficient hydrogen should preferably be used to obtain the desired extent of saturation at the conditions employed. Obviously at a certain set of conditions, not all of the hydrocarbons will be saturated. However, sufficient hydrogen should generally be present to permit complete hydrogenation of all the feed components that can be saturated at the reaction conditions employed. The hydrogen to hydrocarbon mole ratio will preferably be from 1 to 50 and more preferably from 5 to 15. The space velocity will preferably be within the range of 1 to 6 and more preferably from about 1 to 4.

The carrier or support which is used for purposes of the present invention comprises a porous solid carrier. By "porous solid carrier" is meant a carrier which has a high surface area, i.e., greater than 50 $m.^2/gm.$, and preferably greater than 100 $m.^2/gm$. Generally, it is preferred that the porous solid carrier be a porous inorganic oxide. Thus, suitable inorganic oxides which can be used in accordance with the present invention include the oxides of the metals and nonmetals of Groups II through VI of the Periodic Table. Natural or synthetically-produced inorganic oxides, or combinations thereof, can be used. Thus, for example, suitable inorganic oxides include silica, alumina, magnesia, titania, zirconia and combinations thereof. A porous solid carrier which is acidic in nature can be employed. Thus, for example, silica-alumina can be used as a carrier. Other typical porous acidic inorganic oxides are the acid-treated clays and other silica-containing mixed oxides such as silica-magnesia, silica-zirconia, silica-magnesia-titania and silica-alumina-zirconia. When acidic porous carriers, e.g., inorganic oxides, are employed, care must be exercised in controlling the hydrogenation conditions so that substantially no cracking occurs, i.e., less than about 10 weight percent of the feed is cracked and preferably less than 5 weight percent. Thus, hydrogenation conditions, such as low temperatues, high pressures, and high space velocities, can be employed to insure no substantial cracking.

It is preferred for purposes of the present invention that the carrier be nonacidic. By "nonacidic" is meant that the catalyst exhibits little, if any, cracking activity when employed at the hydrogenation conditions most favorable towards cracking within the ranges disclosed above, i.e., at the higher temperatures, lower pressures, etc. disclosed. Hence, preferred supports are alumina, magnesia, and particularly, silica. Silica is the preferred carrier for jet fuel hydrogenation. If a support which is normally acidic is to be used, the support can be neutralized, i.e., the acid sites neutralized, by the addition of basic elements, e.g. lithium or calcium, to the catalyst. Also volatile bases, e.g., ammonia, can be added to the feed to neutralize the acid sites on the catalyst, thereby rendering the catalyst nonacidic.

The metals, nickel and tin, or their compounds, should be present in the catalyst in an amount of from 3 to 60 combined weight percent metals based on the finished catalyst; i.e., regardless of the form in which nickel and tin exist in the catalyst, whether as metallic nickel and tin, or as compounds, such as the oxides or sulfides, or as alloys, the total combined weight percent of nickel and tin in the catalyst, calculated as the metals, should be from 3 to 60. A catalyst containing less than 3 weight percent hydrogenating metal content is too low in hydrogenating activity to be useful. A catalyst composition comprising a total hydrogenating metal content in excess of 60 weight percent can be prepared and employed in hydrogenation. However, the higher concentrations of metals limit the amount of porous solid carrier and also increase the cost of the catalyst. Preferably, the catalyst of the present invention comprises nickel and tin, or their compounds, in an amount from 3 to 50 combined weight percent and preferably 5 to 30 combined weight percent metals.

The nickel and tin, or their compounds, should be present in the catalyst in a weight ratio of nickel to tin of from 0.25 to 20, determined as the metals. Preferably, the nickel to tin weight ratio is from 0.25 to 10 and more preferably from 0.5 to 10. In general, when employing high combined weight percents of nickel and tin, it is preferred to use high nickel to tin weight ratios.

The hydrogenating metals, that is, nickel and tin, can be in the metallic form or in compound form, such as, for example, the oxides or sulfides. Any compounds of the metals which perform as hydrogenating components can be used in the catalyst. Other hydrogenating components, e.g., iron or molybdenum, may also be present.

The catalytic composition of the present invention can be prepared by any of the conventional methods for associating catalytically active amounts of hydrogenating metal components with a carrier. Thus, the nickel and tin components may be associated with a porous solid carrier by impregnation or by ion-exchange. Impregnation is generally accomplished using an aqueous solution of a suitable nickel compound and/or tin compound. Either simultaneous or sequential impregnation of the metal components is suitable. Ion-exchange is generally accomplished by using an aqueous solution of a suitable metal salt wherein the nickel and/or tin is present in the cationic state. As examples, in the preparation of a catalyst wherein the carrier is an amorphous silica, the nickel and tin are normally associated with the silica by impregnation. Typical nickel and tin compounds which can be used for impregnation or ion-exchange are the chlorides, nitrates, sulfates, acetates, and ammine complexes. The tin can be in the stannous or stannic oxidation state.

The catalyst used in the present invention can be prepared by coprecipitating or cogelling a mixture of compounds of the hydrogenating metals and compounds of the metals and/or nonmetals whose oxides form the preferred carrier, i.e., an inorganic oxide carrier. Both hydrogenating metals can be coprecipitated or cogelled with the compounds of the metals and/or nonmetals whose oxides from the inorganic oxide carrier; or, one of the hydrogenating metals can be associated with the inorganic oxide carrier by coprecipitation or cogelation, and the other hydrogenating metal then intimately associated with the coprecipitated composite by impregnation or other suitable means. For example, a coprecipitated composite of tin, or compound thereof, and silica-alumina can be prepared by coprecipitating a mixture of stannous chloride, aluminum chloride, and sodium silicate. Nickel, e.g., as nickel nitrate, can then be intimately associated with the coprecipitated composite by impregnation.

A preferred method of preparation of the catalytic composition used in the process of the present invention is by simultaneous coprecipitation or cogelation of a mixture of nickel and tin compounds, and compounds of the metals and/or nonmetals whose oxides form the inorganic oxide carrier. The method of preparation of a coprecipitated composite of only one of the hydrogenating metals and an inorganic oxide is, in general, the same as that for a coprecipitated composite of both metals and an inorganic oxide. For the sake of brevity, the preparation of a coprecipitated composite will be described only in terms of using both hydrogenating metals in the coprecipitated composite. In general, preparation of the coprecipitated composite can be accomplished by forming a solution and/or a sol of the compounds, subsequently precipitating the mixture, preferably at a pH from about 5.5 to 8, by the addition of a precipitating agent, as, for example, a base, and then washing the coprecipitated composite to remove extraneous materials. Finally, the coprecipitated composite can be dried and then calcined at an elevated temperature.

In order to prepare a coprecipitated composite comprising the porous inorganic oxides and nickel and tin components, it is desirable that the starting components be such that when admixed together the resulting mixture will form a solution and/or sol so as to obtain uniform dispersion throughout the mixture.

The compounds in the intial mixture can advantageously be salts such as the nitrates, citrates, formates, alkoxides, and sulfates. Preferably chlorides and acetates are employed. In view of the process advantages of using chloride salts due to their readiness to form solutions with other compounds, their commercial availability and relatively low price, it is often desirable to employ them. The anion content, e.g., chloride, in the final coprecipitate is preferably reduced to below about 0.25 percent of the total weight of the final coprecipitate. Washing with water can often effectively lower the anion content of the desirable limit. If anions are present in the coprecipitate which are difficult to remove by washing, such anions can be ion-exchanged with anions more easily removed by washing. Preferred anions for use in ion-exchange are the bicarbonates, carbonates, acetates, and formates.

After formation of the initial mixture, it is coprecipitated by conventional techniques. Precipitation is preferably conducted at a pH between about 5.5 and about 8. Thus, the initial mixture, if acidic, can be precipitated by the addition of a base. If the mixture is basic, it can be precipitated with an acid. The precipitation can be stepwise, as by a form of titration, or simultaneous, as by mixing of acidic or basic solutions as the case may be in the proper ratios. It is preferable that the precipitating agent should not introduce any components in the mixture that are deleterious.

Following precipitation of the mixture of compounds, the excess liquid is usually removed by filtration. Thereafter the precipitate is washed and ion-exchanged to remove impurities. Washing is generally conducted in more than one step, using water or dilute aqueous solutions of ammonium salts, e.g., ammonium acetate. The coprecipitated composite is then dried in air or inert gases at a temperature less than 400° F., preferably from about 150–300° F. The coprecipitate is then calcined, generally at a temperature of from about 750 to 1400° F. in the presence of an oxygen-containing gas. Preferably, the calcination temperature is less than about 1300° F.

Prior to using the catalyst in the hydrogenation reaction, it is preferred to reduce the metals by contacting them at an elevated temperature in the presence of a reducing agent, for example, hydrogen. Dry hydrogen is preferred. The reduction temperature is preferably greater than about 800° F. The hydrogenation activity of the catalyst is increased as the temperature of reduction is increased. However, at an extreme temperature, e.g., above about 1650° F., the metals and base sinter, thereby damaging the catalyst for hydrogenation reactions.

The general preparation procedures for obtaining catalyst compositions useful for hydrogenation are more fully described in application Ser. No. 568,536 and application Ser. No. 645,855 now Patent No. 3,399,132. The disclosures of these two applications are incorporated herein by reference thereto.

The process of the present invention will be more fully explained and understood by reference to the following examples.

*Example 1.*—A nickel-tin containing catalyst was prepared and compared with a nickel-containing catalyst for jet fuel hydrogenation.

The nickel-tin catalyst was prepared as follows: 878 grams of sodium silicate in 4 liters of water were added to a mixture of 53.2 grams of $SnCl_2 \cdot 2H_2O$, 180 grams of acetic acid, 447 grams of a nickel chloride solution containing 181 gms./liter of nickel, and 8.3 liters of water. The resulting mixture was neutralized by the addition of ammonium hydroxide. The resulting slurry was aged for one hour at approximately 200° F. and filtered, washed with ammonium acetate, and dried. Thereafter the catalyst was calcined at about 1275° F. and then reduced at about 1200° F. The nickel-tin catalytic composite comprised 7.7 weight percent tin and 14.3 weight percent nickel, the remainder being silica.

The nickel-containing catalyst was prepared as follows: 1172 grams of sodium silicate in 4 liters of water were added to a mixture of 447 grams of nickel chloride solution containing 181 gms./liter of nickel, 180 grams of acetic acid, and 8.3 liters of water. The resulting mixture was neutralized by the addition of ammonium hydroxide. The resulting slurry was hot aged for about one hour at 200° F. and then filtered, washed, and dried. The catalyst was calcined at 1275° F. and reduced at about 1200° F. The nickel-silica catalytic composite comprised 12.8 weight percent nickel. The surface area of both catalysts were approximately the same, that is, about 500 m.²/gm. Both catalysts were sulfided prior to the test.

A jet fuel fraction boiling within the range of 308 to 526° F., and containing 11.1 volume percent paraffins, 59.8 volume percent naphthenes, and 29.1 volume percent aromatics and having an aniline point of about 109.5 was used for the hydrogenation processes. The feed contained about 1.0 p.p.m. sulfur. Both the nickel-tin catalyst and the nickel catalyst were used to hydrogenate the jet fuel fraction at substantially the same conditions. The hydrogenation conditions included a pressure of 1300 p.s.i.g., a hydrogen flow rate of 1500 s.c.f./bbl., a liquid hourly space velocity of 3.3 and a catalyst temperature of about 665° F. No substantial cracking occurred during the hydrogenation process, i.e., less than 5 percent cracking occurred.

The aniline point of the product was measured for the hydrogenation processes using the two catalysts. The aniline point is a measure of the aromatic content of the product. The higher the aniline point of the product, the less aromatic the product. Thus a god hydrogenation catalyst will substantially increase the aniline point of the product compared to the aniline point of the feed. The hydrogenation process using the nickel-tin-silica catalyst produced a product having an aniline point of about 143 when no sulfur was present. The aniline point of the product from the hydrogenation process using the nickel-silica catalyst was about 120. Thus, it is seen that tin significantly improves the hydrogenation activity of a nickel-containing catalyst.

Sulfur as dimethyldisulfide was added to the feed during the hydrogenation process in increasing amounts. Dimethyldisulfide is converted to $H_2S$ in the reaction zone. The addition of sulfur to the process using the nickel-silica catalyst resulted in only a very small change in the product aniline point. However, the addition of sulfur significantly decreased the product aniline point in the hydrogenation process using the nickel-tin-silica catalyst. At about 2000 p.p.m. sulfur to feed the product aniline points of the two processes were approximately the same. The effect of the sulfur on the product aniline point is shown in the attached figure which showes the product aniline point as a function of sulfur in the feed for the jet fuel hydrogenation process using a nickel-tin-silica catalyst (curve 1) and a nickel-silica catalyst (curve 2). The sulfur has only a small effect on the aniline point of the product in the process using the nickel-silica catalyst as seen from curve 2. However, using the nickel-tin-silica catalyst the product aniline point decreased significantly as the sulfur content was increased (curve 1).

A further advantage of the nickel-tin catalyst is its reversible sensitivity to sulfur. As sulfur is added to the hydrogenation system, the hydrogenation activity decreases. However, as sulfur is removed the hydrogenation activity of the catalyst is restored to its former high level.

A catalyst comprising nickel and tin in association with alumina (nickel—20 weight percent; tin—7.5 weight percent based on the finished catalyst) was prepared as a coprecipitate similar to the above described technique for preparing the nickel-tin-silica catalyst. The alumina-based catalyst was tested for jet fuel hydrogenation and found to be effective for hydrogenation, although it was not as good as a silica-based catalyst.

Example 2.—Two catalysts were prepared generally according to the method of Example 1 and were tested for the hydrogenation of benzene. A catalyst comprising a coprecipitated composite of nickel and silica-alumina and a catalyst comprising a coprecipitated composite of nickel-tin-silica-alumina were tested for the hydrogenation of a sulfur-free benzene feed at a temperature of 725° F., a pressure of 1200 p.s.i.a., a liquid hourly space velocity of 3, and a hydrogen to benzene ratio of 10. The conditions were such that substantially no cracking occurred with the nickel-tin catalyst. The catalyst comprising nickel-tin was far superior for the hydrogenation of benzene than the catalyst comprising nickel without tin. For example, after approximately 20 hours operation, the process using the nickel-tin catalyst resulted in a 94.4 mole percent benzene converted to methylcyclopentane and cyclohexane with only 1.4 benzene converted to cracked products. On the other hand, the process using the nickel catalyst without tin resulted in only 83.7 mole percent benzene converted to methylcyclopentane and cyclohexane but 16.2 mole percent benzene converted to cracked products. Thus, the nickel-tin containing catalyst displayed high hydrogenation activity as compared to a catalyst comprising a coprecipitated composite of nickel and silica-alumina without tin.

The two catalysts were also tested for the hydrogenation of a benzene feed containing about 20 p.p.m. sulfur under the same reaction conditions as were used in the tests with the sulfur-free benzene feed. The catalyst comprising nickel and tin produced a higher concentration of converted products (methylcyclopentane and cyclohexane) over a significantly longer period of time than the catalyst comprising nickel but containing no tin. The sulfur markedly decreased the benzene hydrogenation activity of the nickel catalyst after only about 5 hours onstream time. The benzene hydrogenation activity of the nickel-tin catalyst decreased as a result of the presence of sulfur only after 15 to 20 hours onstream time.

The foregoing disclosure of this invention is not considered to be limiting since variations can be made by those skilled in the art without departing from the scope and spirit of the appended claims.

I claim:

1. A process for converting unsaturated hydrocarbons to more saturated hydrocarbons, without substantial cracking, which comprises subjecting said unsaturated hydrocarbons to hydrogenation in the presence of hydrogen and at hydrogenation conditions with a catalyst comprising nickel, or compounds of nickel, and tin, or compounds of tin, associated with a porous solid carrier, said nickel and tin combined weight percent being from 3 to 60, the nickel to tin weight ratio being from 0.25 to 20.

2. A process for converting aromatic hydrocarbons into more saturated hydrocarbons, without substantial cracking, which comprises subjecting said aromatic hydrocarbons to hydrogenation in the presence of hydrogen and a catalyst comprising nickel, or compounds of nickel, and tin, or compounds of tin, associated with a porous solid carrier, said nickel and tin combined weight percent being from 3 to 60, the nickel to tin weight ratio being from 0.25 to 20.

3. The process of claim 1 wherein said feed contains less than 2000 p.p.m. sulfur to feed.

4. The process of claim 1 wherein said feed is a benzene fraction.

5. The process of claim 1 wherein said porous carrier is a porous inorganic oxide.

6. The process of claim 5 wherein said porous inorganic oxide is nonacidic.

7. The process of claim 6 wherein a porous nonacidic inorganic oxide is silica.

8. A process for converting a hydrocarbon jet fuel fraction boiling within the range from about 300 to 550° F. to an improved jet fuel, without substantial cracking, which comprises contacting said fraction at hydrogenation conditions including a temperature of from 350 to 750° F. and a pressure from 600 to 2000 p.s.i.g. and in the presence of hydrogen with a catalyst comprising nickel, or compounds of nickel, and tin, or compounds of tin, associated with a porous nonacidic solid carrier, the nickel and tin combined weight percent being from 3 to 60 with a nickel to tin weight ratio of from 0.25 to 20.

9. The process of claim 8 wherein the carrier is selected from the group consisting of silica, magnesia, and alumina.

10. The process of claim 8 wherein said hydrocarbon fraction contains less than about 4000 p.p.m. sulfur.

11. The process of claim 10 wherein said hydrocarbon fraction contains less than about 2000 p.p.m. sulfur.

References Cited

UNITED STATES PATENTS

| | | | |
|---|---|---|---|
| 2,708,180 | 5/1955 | Fuener et al. | 208—111 |
| 2,910,426 | 10/1959 | Gluesenkamd et al. | 208—143 |
| 3,162,597 | 12/1964 | Davis et al. | 208—143 |
| 3,158,567 | 11/1964 | Cole et al. | 208—143 |
| 3,201,345 | 8/1965 | Hamilton et al. | 208—143 |
| 3,232,863 | 2/1966 | Watson et al. | 208—143 |
| 3,399,132 | 8/1968 | Mulaskey | 208—11 |

HERBERT LEVINE, Primary Examiner

U.S. Cl. X.R.

252—455, 466, 472; 260—667